United States Patent
Hori et al.

(10) Patent No.: US 9,031,144 B2
(45) Date of Patent: May 12, 2015

(54) PEAK FACTOR REDUCTION DEVICE AND WIRELESS TRANSMITTER

(71) Applicant: Hitachi, Ltd., Tokyo (JP)

(72) Inventors: Kazuyuki Hori, Tokyo (JP); Yuuji Ishida, Tokyo (JP); Qian He, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 14/190,533

(22) Filed: Feb. 26, 2014

(65) Prior Publication Data
US 2014/0254718 A1 Sep. 11, 2014

(30) Foreign Application Priority Data
Mar. 8, 2013 (JP) ................... 2013-046168

(51) Int. Cl.
*H04K 1/10* (2006.01)
*H04B 1/04* (2006.01)

(52) U.S. Cl.
CPC .................. *H04B 1/0475* (2013.01)

(58) Field of Classification Search
None
See application file for complete search history.

(56) References Cited

U.S. PATENT DOCUMENTS

2014/0226747 A1* 8/2014 McCallister .............. 375/285

FOREIGN PATENT DOCUMENTS

JP 2012-019401 A 1/2012

* cited by examiner

*Primary Examiner* — Adolf Dsouza
(74) *Attorney, Agent, or Firm* — Volpe and Koenig, P.C.

(57) ABSTRACT

To satisfy the required SNR values for each system and/or each channel, a peak factor reduction device for reducing peak components included in a transmission signal, generates a cancellation signal to be multiplexed on the transmission signal, and the peak factor reduction device changes an amplitude of the generated cancellation signal according to a signal noise ratio required for the transmission signal and a power level of the transmission signal.

9 Claims, 10 Drawing Sheets

PEAK FACTOR REDUCTION DEVICE AND WIRELESS TRANSMITTER

CLAIM OF PRIORITY

The present application claims priority from Japanese patent application JP 2013-046168 filed on Mar. 8, 2013, the content of which is hereby incorporated by reference into this application.

BACKGROUND OF THE INVENTION

The present invention relates to a device that reduces a peak factor (a ratio of maximum instantaneous power to average power) of a transmission signal.

In orthogonal frequency division multiplexing (OFDM) employed in WiMAX, 3GPP LTE, or the like, peaks having large power appear in a transmission signal. Since a power amplifier of a wireless transmitter has nonlinearity, distortion occurs in an output signal if a transmission signal including peaks is input. This distortion deteriorates transmission characteristics and becomes the causes of spurious radiation.

Thus, a device having excellent input-output linearity is used in a power amplifier to decrease the distortion of a transmission signal including large peaks. Moreover, the peaks included in a transmission signal are reduced to increase the output power level without saturating the power amplifier.

A peak factor reduction device disclosed in JP 2012-19401 A is known as a conventional art of this technical field.

JP 2012-19401 A discloses a peak factor reduction method in which, when a peak cancellation signal $Y=X(|X|-A0)/|X|$ equal to a portion of a multi-carrier signal X exceeding a threshold A0 is created, first, signals $y1Lo1=X|x1|(|X|-A0)/|X|/(|x1|+|x2|+\ldots)$, $y2Lo2=X|x2|(|X|-A0)/|X|/(|x1|+|x2|+\ldots)$, $\ldots$, and the like are created, and the peak cancellation signal Y is created as the sum of these signals such that $Y=y1Lo1+y2Lo2+\ldots=X(|X|-A0)/|X|$. A peak reduced output $OUT=X-Y=A0X/|X|$ is obtained, and the amplitude is limited to A0.

SUMMARY OF THE INVENTION

However, in the conventional peak factor reduction method described above, in case where a plurality of systems coexists in one transmitter and shares one power amplifier, the peak factor is equally reduced for one signal in which the signals of the plurality of systems are combined.

In general, a required signal noise ratio (SNR) is different from one system to the other. If the peaks of a transmission signal are suppressed in order to reduce a peak to average power ratio (PAPR) which is a ratio of maximum instantaneous power to average power, distortion occurs in the transmission signal and SNR deteriorates. That is, it can be said that SNR and PAPR have a tradeoff relationship.

Thus, there is a problem in that, if the peak factor is reduced based on the worst SNR so that the SNRs of all systems are satisfied, it is difficult to reduce the PAPR sufficiently.

Further, in a certain system, the required SNR is different from one transmission signal to the other (for example, when different transmission signals are used in each channel). For example, in a WiMAX system, the SNR required when transmitting preambles is different from the SNR required when transmitting data.

Thus, it is necessary to appropriately reduce the peak factor according to the SNR required for each system and/or each channel.

However, in the conventional peak factor reduction method described above, since the same cancellation signal is generated to reduce the peak factor even if the signal noise ratios (SNRs) required for systems are different, it is not possible to satisfy a target PAPR required for satisfying the required SNRs. Thus, it is necessary to use a power amplifier having high linearity and low efficiency, which may increase power consumption.

The representative one of inventions disclosed in this application is outlined as follows. There is provided a peak factor reduction device for reducing peak components included in a transmission signal. The peak factor reduction device generates a cancellation signal to be multiplexed on the transmission signal, and the peak factor reduction device changes an amplitude of the generated cancellation signal according to a signal noise ratio required for the transmission signal and a power level of the transmission signal.

According to the exemplary embodiment of the present invention, it is possible to reduce the PAPR of the entire system as much as possible while satisfying the required SNR values for each system and/or each channel. Problems, configurations, and effects which have not been described become apparent from the following description of embodiments.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

First, a first embodiment of the present invention will be described.

Figure 1:
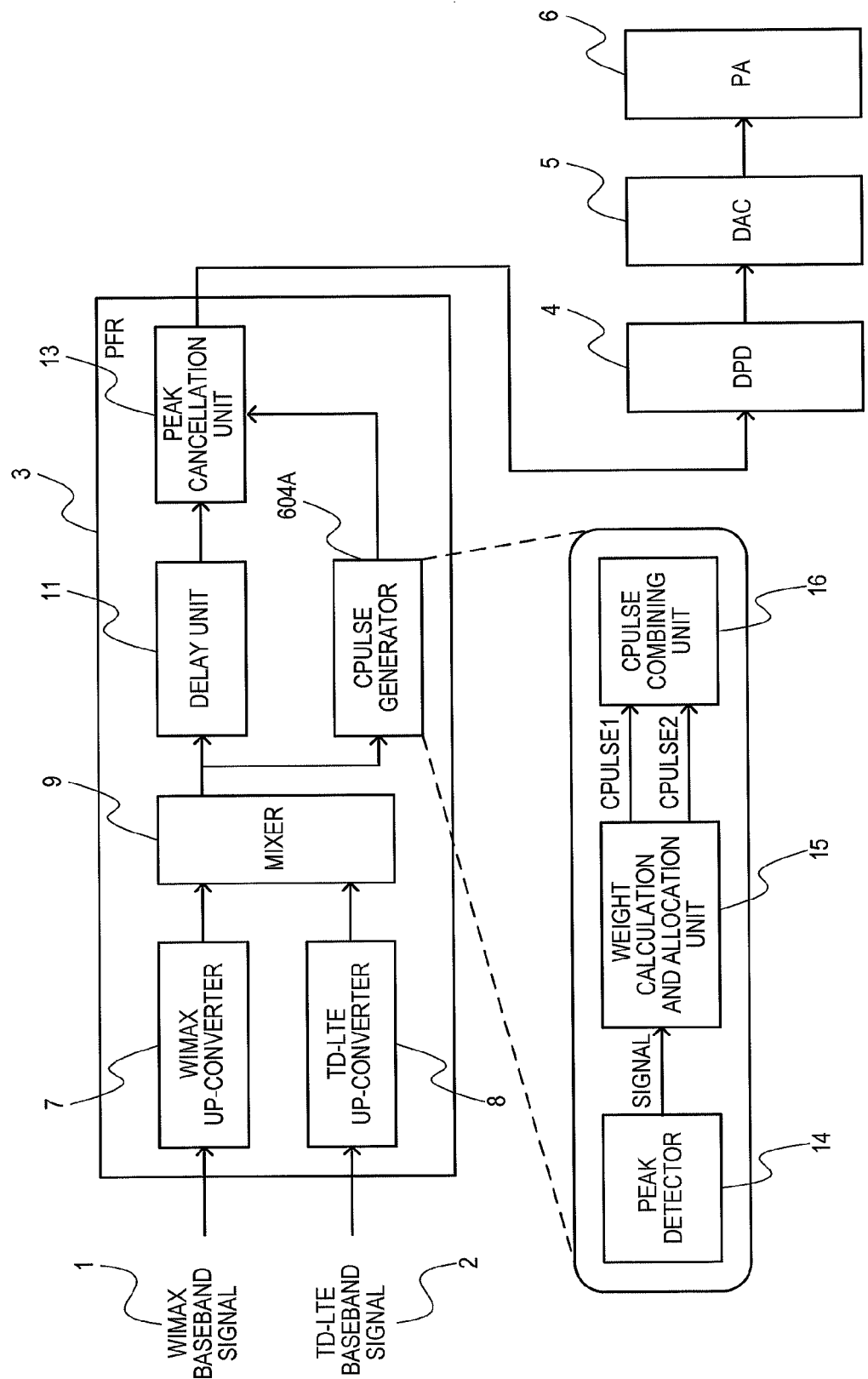
FIG. 1 is a block diagram illustrating a configuration of a wireless transmitter according to a first embodiment.

FIG. 1 is a block diagram illustrating the configuration of a wireless transmitter according to the first embodiment.

A wireless transmitter of the first embodiment includes a WiMAX baseband signal generator 1, a TD-LTE baseband signal generator 2, a peak factor reduction device (PFR) 3, a digital predistortion unit (DPD) 4, a DA converter (DAC) 5, and a power amplifier (PA) 6.

The peak factor reduction device 3 reduces the peak factor of a baseband signal. The peak factor reduction device 3 includes a WiMAX up-converter 7, a TD-LTE up-converter 8, a mixer 9, a delay unit 11, a Cpulse generator 604A, and a peak cancellation unit 13. The Cpulse is short for a Cancelling pulse.

Although the peak factor reduction device 3 of the present embodiment includes the converters 7 and 8 and the mixer 9, the peak factor reduction device 3 may include only the delay unit 11, the Cpulse generator 604A, and the peak cancellation unit 13.

In the present specification, although a ratio of peak value to effective value of a waveform is referred to as a peak factor, the ratio is generally referred to as a crest factor reduction (CFR), and both have the same meaning.

The WiMAX baseband signal generator 1 generates a WiMAX baseband signal. The WiMAX up-converter 7 converts the frequency of the generated WiMAX baseband signal into a transmission frequency.

The TD-LTE baseband signal generator 2 generates a TD-LTE baseband signal. The TD-LTE up-converter 8 converts the frequency of the generated TD-LTE baseband signal into a transmission frequency.

The mixer 9 mixes the frequency converted WiMAX baseband signal and the frequency converted TD-LTE baseband signal.

The delay unit 11 delays the transmission of signals by a time period necessary for the processing of the Cpulse generator 604A.

The Cpulse generator 604A generates a cancellation signal used for reducing a peak factor. The Cpulse generator 604A includes a peak detector 14, a weight calculation and allocation unit 15, and a Cpulse combining unit 16.

The peak detector 14 detects peaks of the baseband signals mixed by the mixer 9. The weight calculation and allocation unit 15 calculates a coefficient (weight) to be multiplied with a cancellation signal for each baseband signal. The Cpulse combining unit 16 multiplies the coefficient calculated by the weight calculation and allocation unit 15 to generate a cancellation signal for each baseband signal.

The peak cancellation unit 13 reduces the peak factor using the cancellation signal generated by the Cpulse generator 604A.

The digital predistortion unit 4 adds distortion inverse to the distortion characteristics of a transmitter in order to improve the distortion characteristics. The DA converter 5 converts the input digital signal (baseband signal) into an analog signal. The power amplifier 6 amplifies the input signal to a desired power level transmitted from an antenna.

The wireless transmitter illustrated in FIG. 1 frequency-multiplexes the transmission signal of a WiMAX system and the transmission signal of a TD-LTE system so as to correspond to both systems. However, the present invention can be applied to a wireless transmitter that multiplexes signals of a plurality of different systems.

Figure 2:
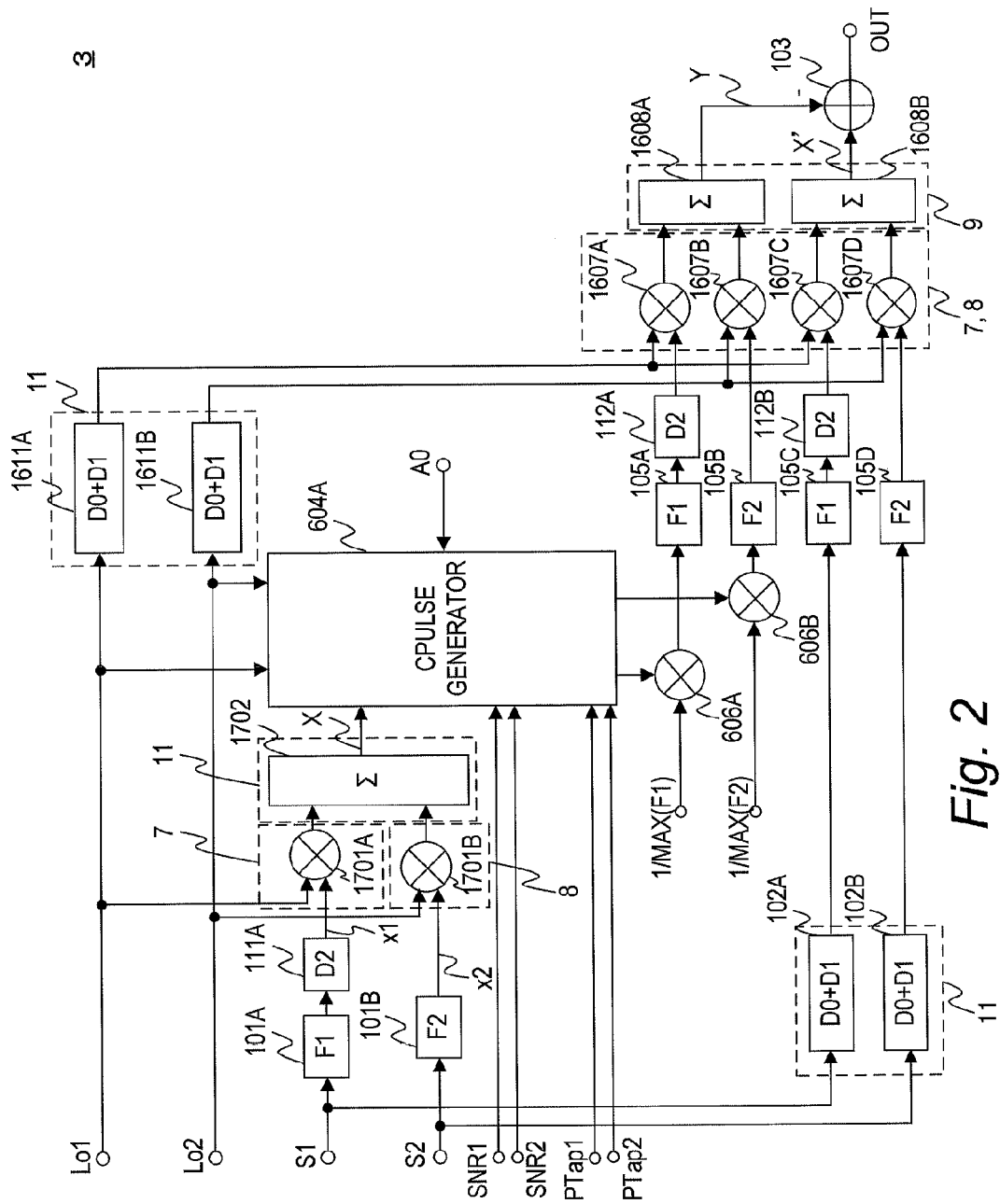
FIG. 2 is a block diagram illustrating a configuration of a peak factor reduction device according to the first embodiment.

FIG. 2 is a block diagram illustrating a configuration of the peak factor reduction device 3 according to the first embodiment.

The peak factor reduction device 3 of the first embodiment includes a cancellation signal generator 604A, multipliers 606A, 606B, 1607A to 1607D, 1701A, and 1701B, adders 1608A, 1608B, and 1702, a subtractor 103, delay units 102A, 102B, 111A, 112A, 112B, 1611A, and 1611B, and filters 101A, 101B, and 105A to 105D.

The peak factor reduction device 3 of the first embodiment receives a WiMAX baseband signal S1 generated by the WiMAX baseband signal generator 1 and a TD-LTE baseband signal S2 generated by the TD-LTE baseband signal generator 2. Moreover, the peak factor reduction device 3 also receives high-frequency signals (carrier signals) Lo1 and Lo2 generated by a local oscillator. The local oscillator generates the high-frequency signal Lo1 of the WiMAX system and the high-frequency signal Lo2 of the TD-LTE system. In the peak factor reduction device illustrated in FIG. 2, the frequency of the high-frequency signal Lo1 of the WiMAX system is different from the frequency of the high-frequency signal Lo2 of the TD-LTE system, and these signals are multiplied whereby a frequency-multiplexed signal is generated.

The filters 101A and 101B limit the bands of the input baseband signals S1 and S2, respectively. The band-limited signals x1 and x2 are input to the multipliers 1701A and 1701B. The multipliers 1701A and 1701B multiply signals output from the filters 101A and 101B with the high-frequency signals Lo1 and Lo2 of predetermined frequencies to orthogonally modulate the high-frequency signals Lo1 and Lo2, respectively, and input the modulated signals to the adder 1702. The delay unit 111A is inserted in the line of the baseband signal S1 so as to perform adjustment for synchronizing signals to absorb a difference between a delay unit in the filter 101A and a delay unit in the filter 101B.

A delay period D2 of the delay unit 111 is set to a period which is a subtraction of a delay period D(F1) of the filter 101A from a delay period D(F2) of the filter 101B (D2=D(F2)−D(F1)). This is the case of D(F2)>D(F1), and the delay unit 111A may be provided at the rear of the filter 101B if D(F1)>D(F2).

The adder 1702 adds modulated signals to obtain a combined multi-carrier signal X and inputs the combined multi-carrier signal X to the cancellation signal generator 604A.

The high-frequency signals Lo1 and Lo2 are also input to the cancellation signal generator 604A. Moreover, the high-frequency signal Lo1 is input to the multipliers 1607A and 1607C provided at an output stage via the delay unit 1611A, and the high-frequency signal Lo2 is input to the multipliers 1607B and 1607D provided at the output stage via the delay unit 1611B.

The peak factor reduction device 3 receives required signal noise ratios SNR1 and SNR2, filter characteristics PTap1, PTap2, 1/max(F1), and 1/max(F2), and a threshold A0. The SNR1 is a signal noise ratio required in a WiMAX system, and the SNR2 is a signal noise ratio required in a TD-LTE system. The PTap1 is a signal intensity of the transmission signal of the WiMAX system after passing through a PFR filter having characteristics of F1, and the PTap2 is a signal intensity of a transmission signal of the TD-LTE system after passing through a PFR filter having characteristics of F2. The max (F1) is a maximum value of the filter coefficient F1, and the max (F2) is a maximum value of the filter coefficient F2. The threshold A0 is a threshold for determining that the amplitude of the transmission signal X input to the cancellation signal generator 604A is large.

The peak cancellation signal generator 604A generates a signal for cancelling the peaks of the transmission signal. The detailed configuration of the peak cancellation signal generator 604A will be described with reference to FIG. 3.

The cancellation signal output from the cancellation signal generator 604A is input to the multipliers 606A and 606B. The multipliers 606A and 606B divide the output signal of the cancellation signal generator 604A by max (F1) and max (F2), respectively. By dividing the output signal by the maximum value of the filter coefficient, the crest values corresponding to the peaks do not change even when the output signal passes through the filters 105A and 105B.

The cancellation signals output from the multipliers 606A and 606B are input to the multipliers 1607A and 1607B via the filters 105A and 105B, respectively. The delay unit 112A is inserted in the line of the cancellation signal of the WiMAX system so as to perform adjustment for synchronizing signals to absorb a difference between a delay unit in the filter 101A and a delay unit in the filter 101B.

The carrier signals Lo1 and Lo2 are input to the multipliers 1607A and 1607B, respectively. The carrier signals Lo1 and Lo2 input to the multipliers 1607A and 1607B are delayed by D0+D1 by the delay units 1611A and 1611B so as to synchronize the points in time when the carrier signals are delayed by the processing period of the cancellation signal generator 604A. The delay amount D0 corresponds to a delay period of an absolute value circuit 201, an excess amplitude normalization unit 10, and the peak detector 200, and the delay amount D1 corresponds to a maximum value of the delays in the filter (F1) 101A and the filter (F2) 101B.

Moreover, the multipliers 1607A and 1607B multiply the carrier signals Lo1 and Lo2 with the cancellation signal, respectively, to generate high-frequency signals modulated with the cancellation signal. The output signals of the multipliers 1607A and 1607B are input to the adder 1608A.

The adder 1608A adds the output signal of the multiplier 1607A and the output signal of the multiplier 1607B to generate a cancellation signal Y in which the cancellation signals of two systems are combined. The generated cancellation signal Y is input to the subtractor 103.

Moreover, the baseband signals S1 and S2 pass through the delay units 102A and 102B so that the delay periods thereof are adjusted, and are input to the multipliers 1607C and 1607D via the filters 105C and 105D. The delay unit 112B is inserted in the line of the baseband signal of the WiMAX system so as to perform adjustment for synchronizing the phase shift of signals to absorb a difference between a delay unit in the filter 101A and a delay unit in the filter 101B.

Moreover, the carrier signals Lo1 and Lo2 are input to the multipliers 1607C and 1607D, respectively. The carrier signals Lo1 and Lo2 input to the multipliers 1607C and 1607D are delayed by D0+D1 by the delay units 1611A and 1611B so as to synchronize the points in time when the carrier signals are delayed by the processing period of the cancellation signal generator 604A.

The multipliers 1607C and 1607D multiply the carrier signals Lo1 and Lo2 with the baseband signal to generate transmission signals modulated with the baseband signal. The signals output from the multipliers 1607C and 1607D are input to the adder 1608B.

The adder 1608B adds the output signal of the multiplier 1607C and the output signal of the multiplier 1607D to generate a transmission signal X' in which the transmission signals of two systems are combined. The generated transmission signal X is input to the subtractor 103.

The subtractor 103 subtracts the cancellation signal Y from the transmission signal X' to generate a transmission signal of which the peak factor is reduced.

Figure 3:
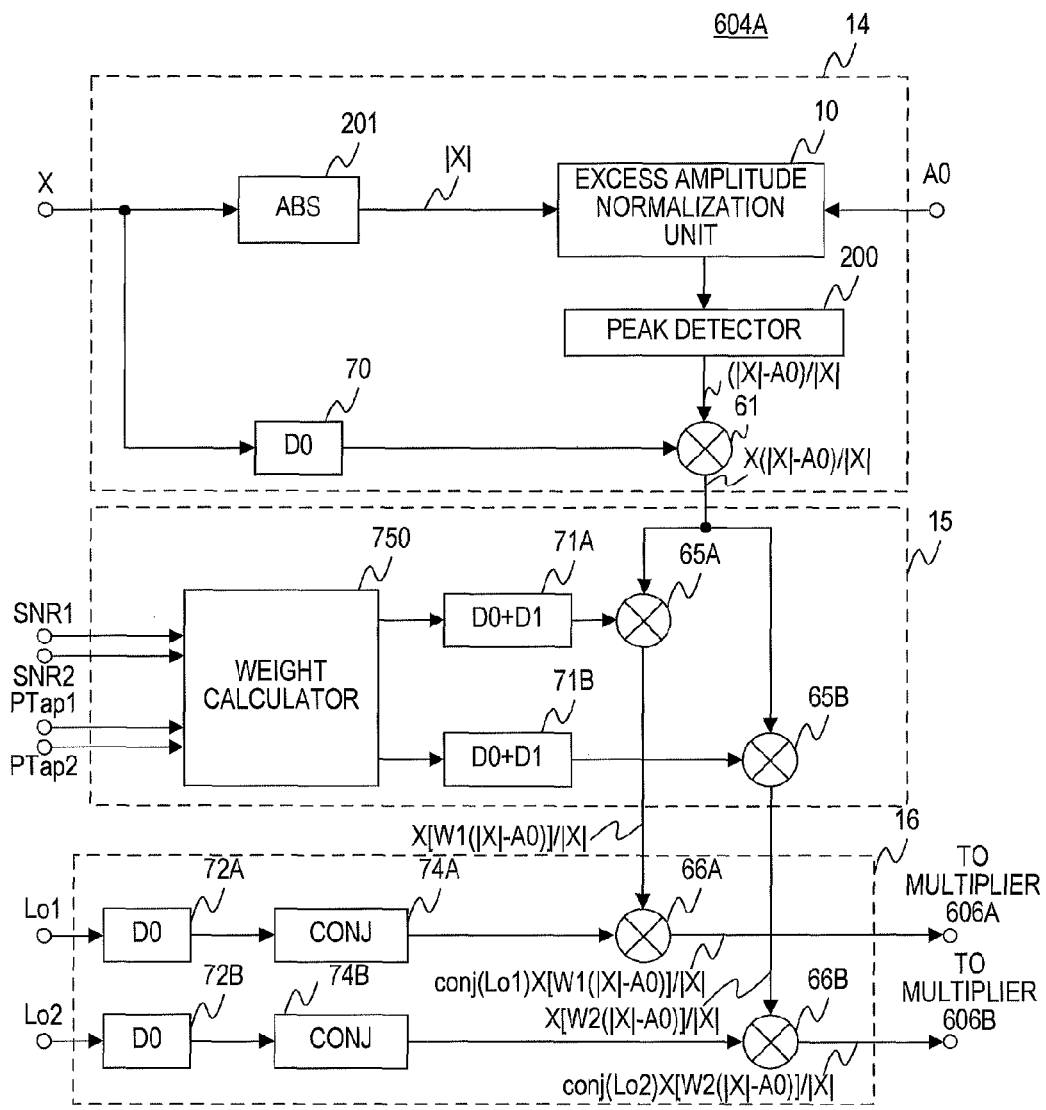
FIG. 3 is a block diagram illustrating a configuration of a peak cancellation signal generator according to the first embodiment.

FIG. 3 is a block diagram illustrating configuration of the peak cancellation signal generator 604A according to the first embodiment.

The peak cancellation signal generator 604A of the first embodiment includes the absolute value circuit 201, the excess amplitude normalization unit 10, the peak detector 200, a weight calculator 750, conjugate circuits 74A and 74B, multipliers 61, 65A, 65B, 66A, and 66B, and delay units 70, 71A, 71B, 72A, and 72B.

The absolute value circuit 201 calculates the amplitude $|X|$ of the multi-carrier signal X combined by the adder 1702. The amplitude $|X|$ is input to the excess amplitude normalization unit 10.

The excess amplitude normalization unit 10 extracts an excess portion $|X|-A0$ of the amplitude $|X|$ exceeding the threshold A0 and normalizes the excess portion $|X|-A0$ with the amplitude $|X|$ of the multi-carrier signal X. The output signal $(|X|-A0)/|X|$ of the excess amplitude normalization unit 10 is input to the peak detector 200.

The peak detector 200 outputs a maximum value of input values in a predetermined range (for example, n samples each before and after a reference point, that is, continuous 2n+1 samples) to the multiplier 61.

The multiplier 61 multiplies the input multi-carrier signal X and the output signal of the peak detector 200 and outputs a signal $X(|X|-A0)/|X|$ that is proportional to the multi-carrier signal X. The multi-carrier signal X input to the multiplier 61 is delayed by the delay unit 70 so as to be synchronized with the output signal of the peak detector 200.

The weight calculator 750 calculates weight coefficients W1 and W2 to be multiplied with the detected maximum value based on the input signal noise ratios SNR1 and SNR2 and the input filter characteristics PTap1 and PTap2. The detailed configuration of the weight calculator 750 will be described with reference to FIG. 4.

The carrier signals Lo1 and Lo2 input to the peak cancellation signal generator 604A are delayed by a D0 sample period by the delay units 72A and 72B, respectively, so as to be synchronized with the output signal of the peak detector 200. After that, the conjugate circuits 74A and 74B calculate complex conjugates of the carrier signals Lo1 and Lo2 and output the complex conjugates to the multipliers 66A and 66B, respectively.

The multipliers 66A and 66B multiply the output signals of the multipliers 65A and 65B and the complex conjugates of the carrier signals Lo1 and Lo2.

The output signals of the multipliers 66A and 66B are input to the multipliers 606A and 606B, respectively.

Figure 4:
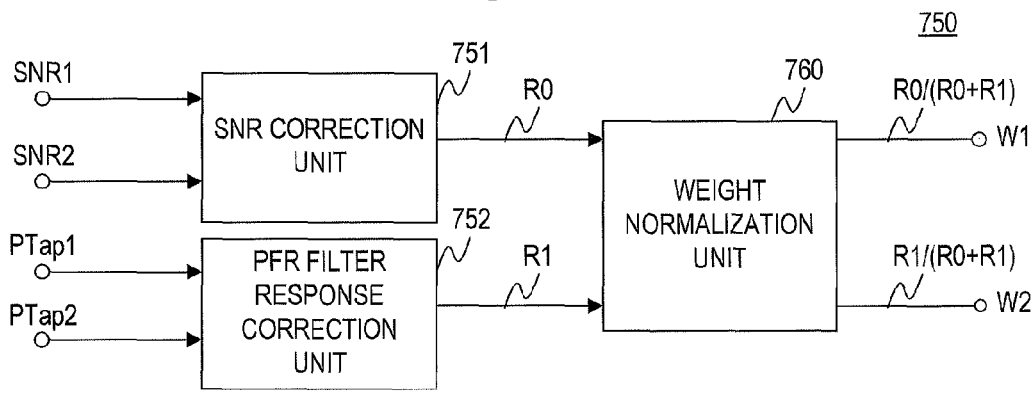
FIG. 4 is a block diagram illustrating a configuration of a weight calculator according to the first embodiment.

FIG. 4 is a block diagram illustrating the configuration of the weight calculator 750 according to the first embodiment.

The weight calculator 750 of the first embodiment includes a SNR correction unit 751, a PFR filter response correction unit 752, and a weight normalization unit 760.

The SNR correction unit 751 calculates a logarithmic ratio R0 between the signal noise ratio SNR2 required for the TD-LTE and the signal noise ratio SNR1 required for the WiMAX system. The R0 is expressed by Expression (13) below.

The PFR filter response correction unit 752 calculates a ratio R1 between the intensity PTap1 of the WiMAX transmission signal after passing through the filter and the intensity PTap2 of the TD-LTE transmission signal after passing through the filter. The R1 is expressed by Expression (14) below.

The weight normalization unit 760 normalizes R0 and R1 to calculate the weight coefficient W1 of the WiMAX transmission signal and the weight coefficient W2 of the TD-LTE transmission signal.

Thus, the weight coefficients of the respective systems are proportional to the SNRs required for the respective systems and the output power levels of the respective systems, and the peak factor can be reduced according to the performance required for the respective systems.

Next, how the weights W1 and W2 are calculated in the peak factor reduction device of the first embodiment will be described with reference to expressions.

The signal noise ratios SNR1 and SNR2 required for system 1 (for example, the WiMAX system) and system 2 (for example, the TD-LTE system) are expressed by Expressions (1) and (2), respectively. In Expressions (1) and (2), PS1 and PS2 are signal intensities of the respective systems, and PN1 and PN2 are noise intensities of the respective systems.

[Expression 1]

$$SNR1 = 10\log_{10}\frac{PS1}{PN1} \quad (1)$$

[Expression 2]

$$SNR2 = 10\log_{10}\frac{PS2}{PN2} \quad (2)$$

When Expressions (1) and (2) are modified, the signal intensities PS1 and PS2 of the respective systems are expressed by Expressions (3) and (4)

[Expression 3]

$$PS1 = PN1 \times 10^{\frac{SNR1}{10}} \quad (3)$$

[Expression 4]

$$PS2 = PN2 \times 10^{\frac{SNR2}{10}} \quad (4)$$

Since the transmission signals of the respective systems are transmitted by the same antenna, the signal intensities of the transmission signals of the respective systems are equal. Thus, the noise intensities PN1 and PN2 of the respective systems have a relation expressed by Expression (5). When Expression (5) is modified, Expression (6) is obtained.

[Expression 5]

$$PN1 \times 10^{\frac{SNR1}{10}} = PN2 \times 10^{\frac{SNR2}{10}} \quad (5)$$

[Expression 6]

$$\frac{PN1}{PN2} = \frac{10^{\frac{SNR2}{10}}}{10^{\frac{SNR1}{10}}} = 10^{\frac{SNR2-SNR1}{10}} \quad (6)$$

Here, the noise intensities PN1 and PN2 of the respective systems are expressed by Expressions (7) and (8) using the calculated weights W1 and W2. In Expressions (7) and (8), as expressed in Expressions (9) and (10), PTap1 and PTap2 are signal intensities of the transmission signals X1 and X2 of the respective systems after passing through the PFR filters, and PN is an intensity of the original cancellation signal generated by the cancellation signal generator 604A.

[Expression 7]

$$PN1 = W1 \times PN \times PTap1 \quad (7)$$

[Expression 8]

$$PN2 = W2 \times PN \times PTap2 \quad (8)$$

[Expression 9]

$$PTap1 = |X1(\omega)^* F1(\omega)|^2 \quad (9)$$

[Expression 10]

$$PTap2 = |X2(\omega)^* F2(\omega)|^2 \quad (10)$$

Moreover, Expression (11) is derived from Expressions (6), (7), and (8).

[Expression 11]

$$\frac{PN1}{PN2} = \frac{W1 \times PTap1}{W2 \times PTap2} = 10^{\frac{SNR2-SNR1}{10}} \quad (11)$$

Further, when Expression (11) is modified, Expression (12) is obtained. In Expression (12), R0 is defined as illustrated in Expression (13) and R1 is defined as illustrated in Expression (14). That is, R0 is a logarithmic ratio between the signal noise ratio SNR2 required for the system 2 and the signal noise ratio SNR1 required for the system 1, and R1 is a ratio between the intensity of the transmission signal of the system 1 after passing through the filter and the intensity of the transmission signal of the system 2 after passing through the filter.

[Expression 12]

$$\frac{W1}{W2} = \frac{10^{\frac{SNR2-SNR1}{10}}}{PTap1/PTap2} = \frac{R0}{R1} \quad (12)$$

[Expression 13]

$$R0 = 10^{\frac{SNR2-SNR1}{10}} \quad (13)$$

[Expression 14]

$$R1 = \frac{PTap1}{PTap2} \quad (14)$$

In this way, the ratio between the weights W1 and W2 of the respective systems is defined as illustrated in Expression (12). Further, when the weights W1 and W2 of the respective systems are normalized, the weights can be expressed by Expressions (15) and (16), respectively.

[Expression 15]

$$W1 = \frac{R0}{R0+R1} \quad (15)$$

[Expression 16]

$$W2 = \frac{R1}{R0+R1} \quad (16)$$

Figure 5:
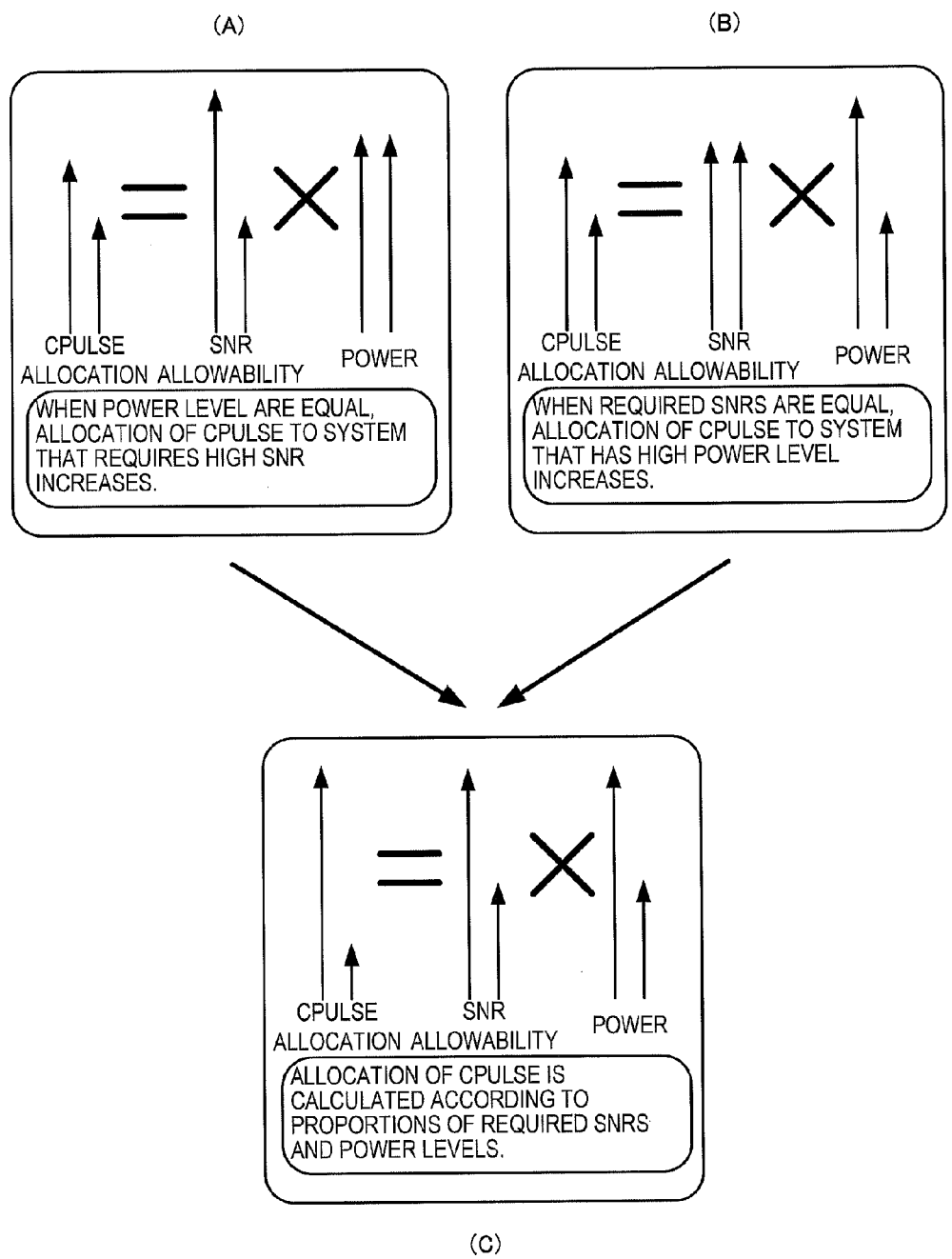
FIG. 5 is diagram illustrating an overview of the first embodiment.

FIG. 5 is diagram illustrating an overview of the embodiment of the present invention.

As illustrated in FIG. 5 (A), in case where the transmission power levels of the respective systems are equal, an allocation of a cancellation signal to a system that requires a high SNR increases. Moreover, as illustrated in FIG. 5 (B), in case where the SNRs required for the respective systems are equal, an allocation of a cancellation signal to a system that has a high transmission power level increases.

In the present embodiment, as illustrated in FIG. 5 (C), the amplitudes of the cancellation signals of the respective systems are determined so that an allocation of a cancellation signal to a system that requires a high SNR increases and that an allocation of a cancellation signal to a system that has a high transmission power level increases. That is, an allocation of the cancellation signal is calculated according to the proportions of the required SNRs and the transmission power levels.

Figure 6:
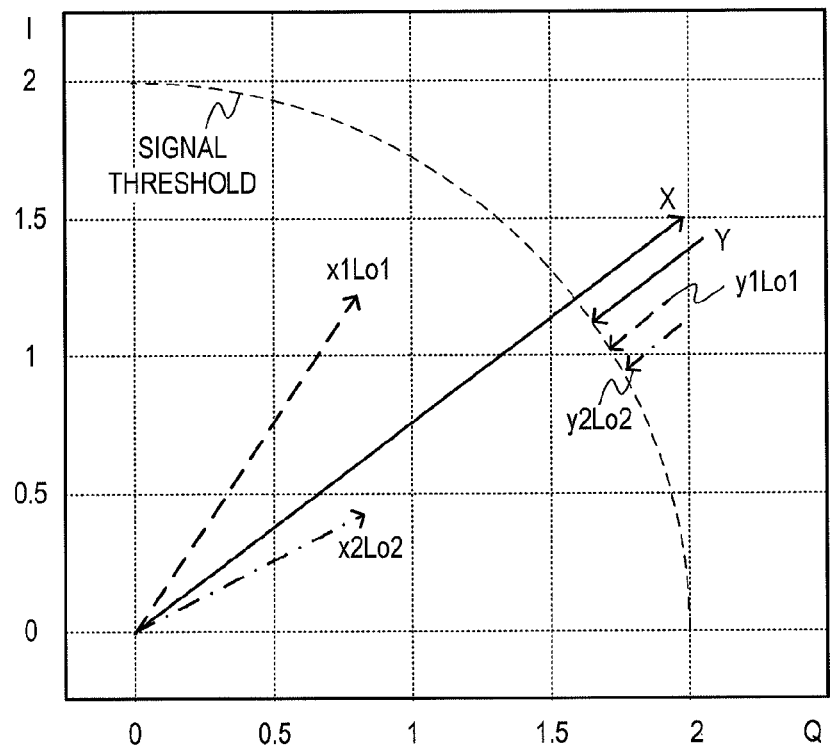
FIG. 6 is a vector diagram illustrating a conventional transmission signal on an IQ plane.
Figure 7:
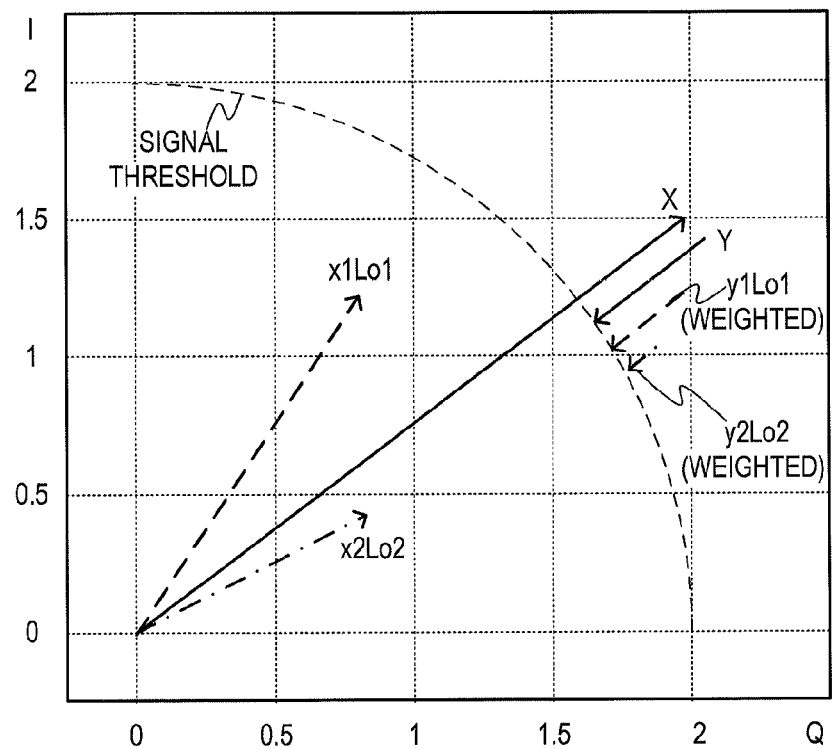
FIG. 7 is a vector diagrams illustrating a transmission signal of the first embodiment on an IQ plane.

FIGS. 6 and 7 are vector diagrams illustrating transmission signals on an IQ plane.

As illustrated in FIG. 6, according to the conventional peak factor reduction, the transmission signal is generated by subtracting the cancellation signal Y from the transmission signal X obtained by combining the transmission signal x1Lo1 of the WiMAX system and the transmission signal x2Lo2 of the TD-LTE system. In this case, the amplitude of the cancellation signal y1Lo1 of the WiMAX system and the amplitude of the cancellation signal y2Lo2 of the TD-LTE system are equal.

On the other hand, as illustrated in FIG. 7, according to the peak factor reduction of the first embodiment, the amplitude of the cancellation signal y1Lo1 of the WiMAX system and the amplitude of the cancellation signal y2Lo2 of the TD-LTE system are different depending on the SNRs and the transmission power levels required for both systems.

FIGS. 8A, 8B, 9A 9B are diagrams illustrating the results of peak factor reduction and the relations between a complementary cumulative distribution function (CCDF) and a signal intensity.

Figure 8A:
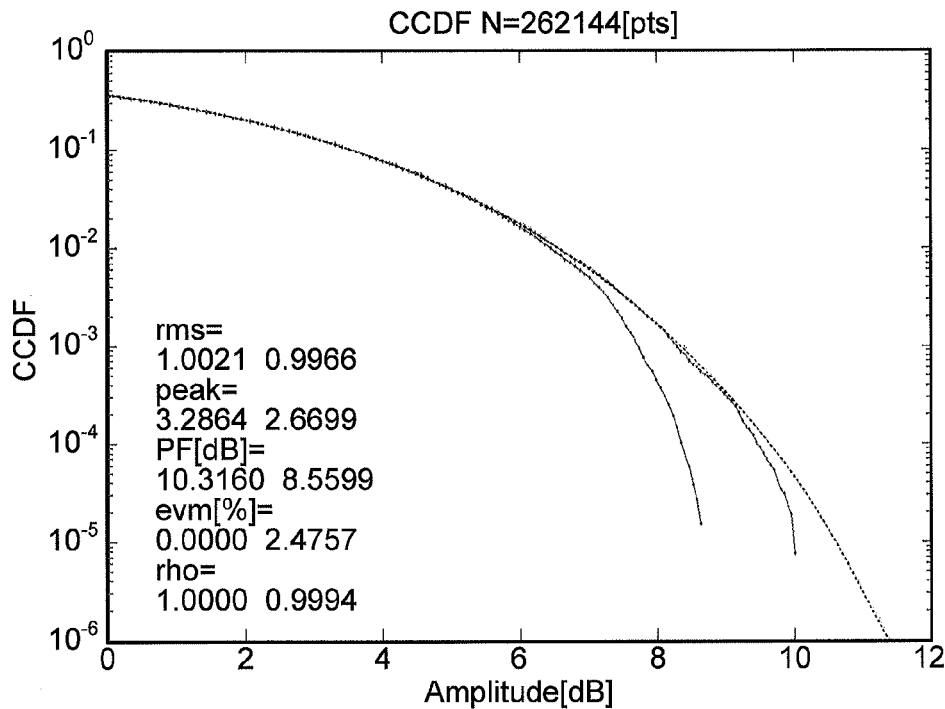
FIGS. 8A and 8B are diagrams illustrating results of conventional peak factor reduction.
Figure 8B:
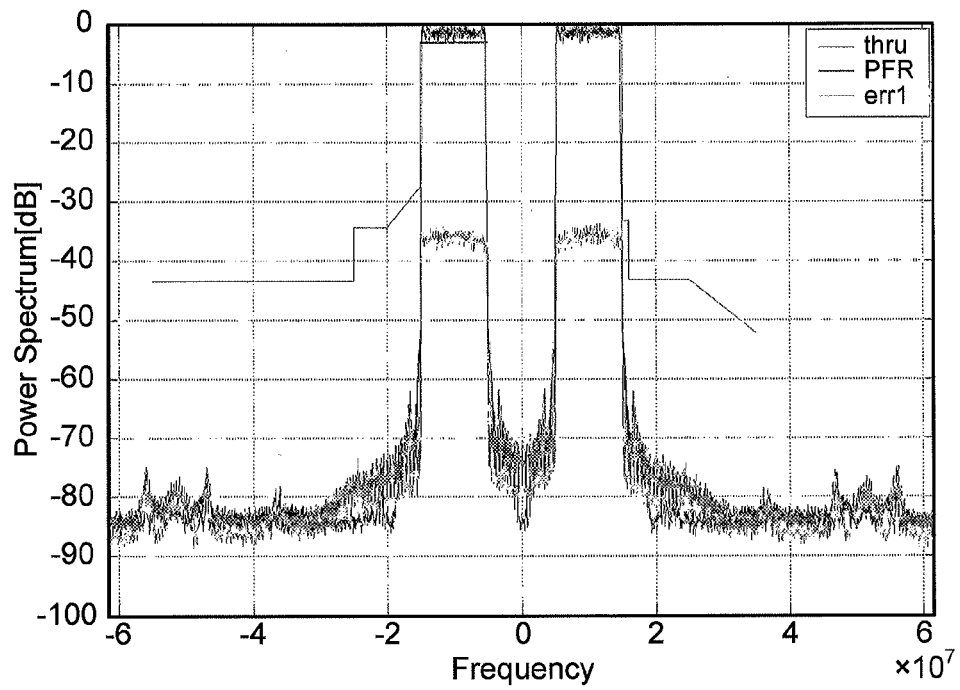

As illustrated in FIG. 8A, the signal intensity of the transmission signal of the WiMAX system and the signal intensity of the transmission signal of the TD-LTE system have similar curves. Moreover, as illustrated in FIG. 8B, in the conventional peak factor reduction, the error rate of the WiMAX system and the error rate of the TD-LTE system are approximately the same.

Figure 9A:
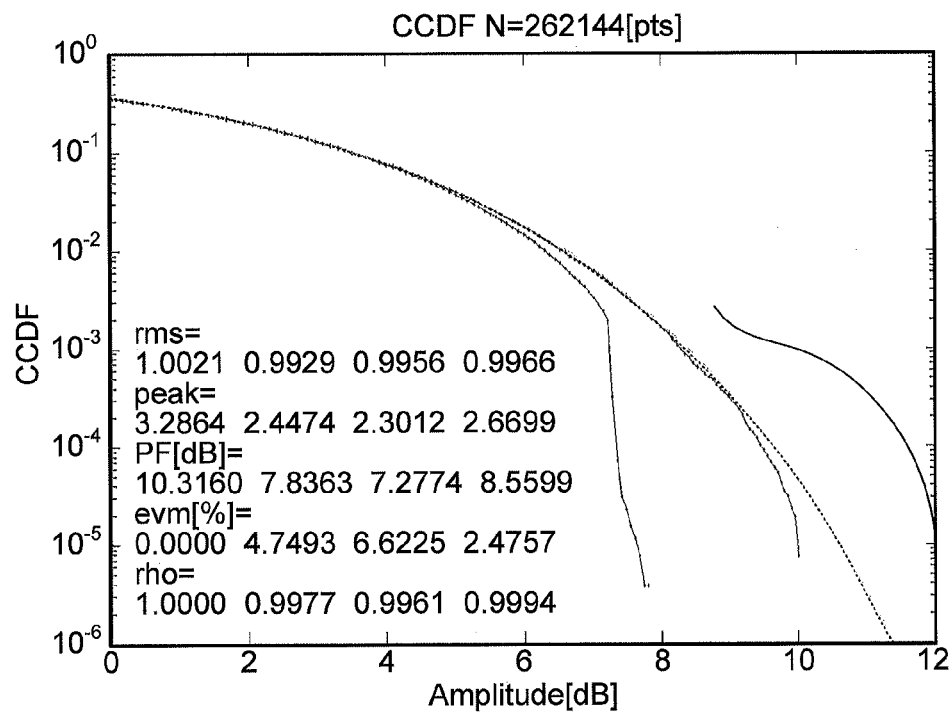
FIGS. 9A and 9B are diagrams illustrating results of peak factor reduction of the first embodiment.
Figure 9B:
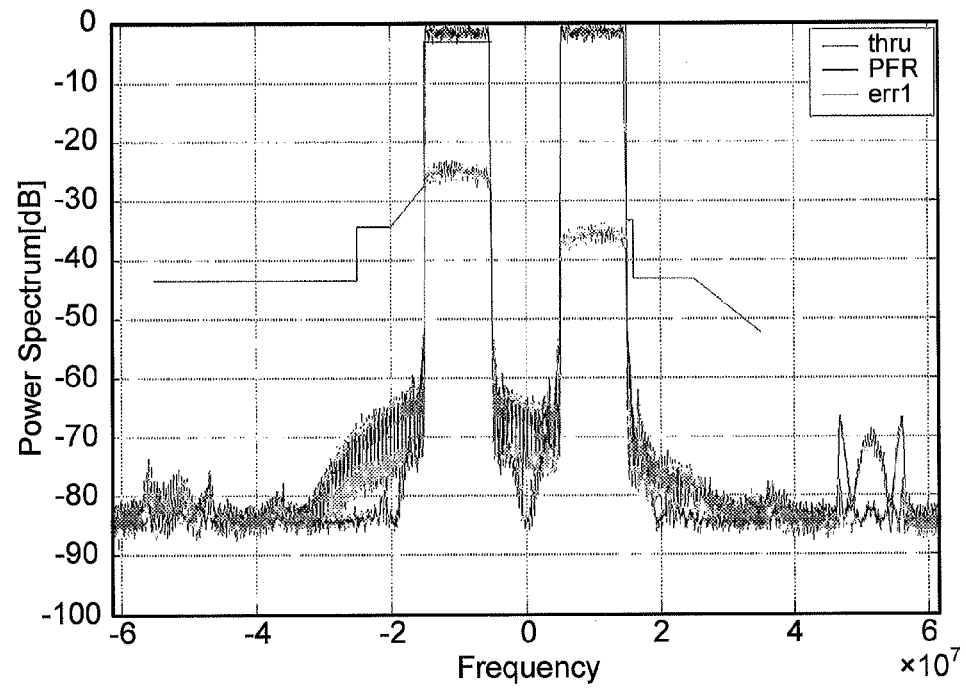

On the other hand, in the peak factor reduction device of the first embodiment, as illustrated in FIG. 9A, looking at the signal intensity of the transmission signal of the WiMAX system and the signal intensity of the transmission signal of the TD-LTE system, the peak factor reduction in the WiMAX system is strong. Moreover, as illustrated in FIG. 9B, in the peak factor reduction of the first embodiment, the error rate of the WiMAX system is lower than the error rate of the TD-LTE system.

As described above, in the first embodiment, it is possible to reduce the peak factor according to the SNRs required for the respective systems. Moreover, by reducing the peak factor of the transmission signal, it is possible to increase the output power level without saturating the power amplifier and to improve the efficiency of the power amplifier.

Second Embodiment

Next, a second embodiment of the present invention will be described.

In some wireless systems, the required SNR may be different depending on the type of signal. For example, symbols used in the WiMAX system have two types of preamble and data, which are transmitted in different channels (different points in time), and the SNRs required for both are different.

Thus, in the second embodiment, a peak factor reduction device 3 that changes a peak factor reduction amount according to the required SNR that differs depending on a signal in the same wireless system unlike the first embodiment will be described. In the second embodiment, the same components as those of the first embodiment will be denoted by the same reference numerals, and description thereof will not be provided. In the second embodiment, although two signals of preamble and data are time-multiplexed, when a plurality of signals is frequency-multiplexed, the same configuration as the first embodiment is employed.

Figure 10:
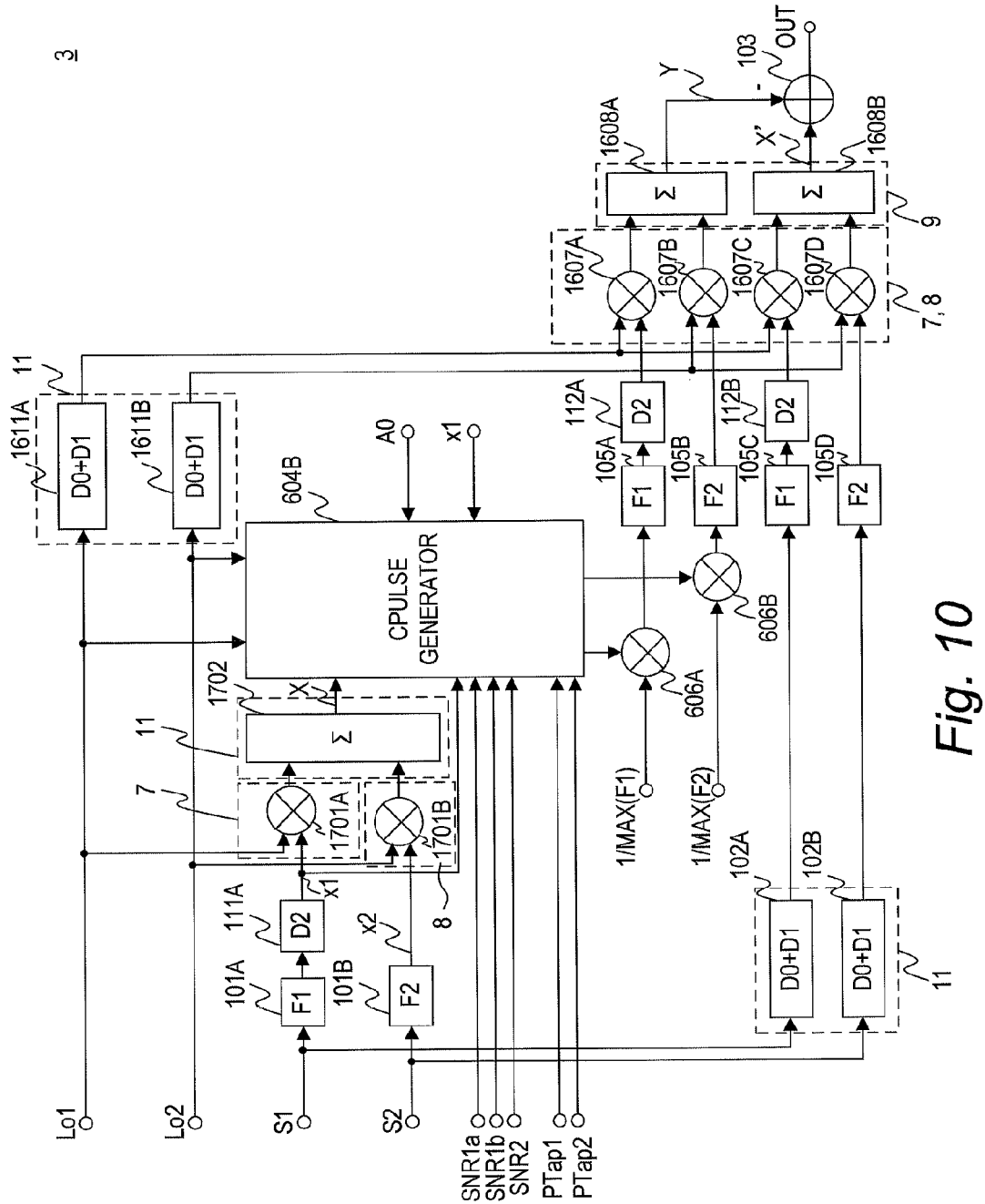
FIG. 10 is a block diagram illustrating a configuration of a peak factor reduction device of a second embodiment.

FIG. 10 is a block diagram illustrating the configuration of the peak factor reduction device 3 of the second embodiment.

The peak factor reduction device 3 of the second embodiment includes a cancellation signal generator 604B, multipliers 606A, 606B, 1607A to 1607D, 1701A, and 1701B, adders 1608A, 1608B, and 1702, a subtractor 103, delay units 102A, 102B, 111A, 112A, 112B, 1611A, and 1611B, and filters 101A, 101B, and 105A to 105D.

The peak factor reduction device 3 of the second embodiment receives baseband signals S1 and S2, high-frequency signals Lo1 and Lo2, required signal noise ratios SNR1$a$, SNR1$b$, and SNR2, filter characteristics PTap1, PTap2, 1/max(F1), and 1/max(F2), a threshold A0, and a signal type x1.

The SNR1$a$ is a signal noise ratio required for the preamble transmitted in the WiMAX system, and the SNR1$b$ is a signal noise ratio required for the data transmitted in the WiMAX system. The signal type x1 indicates whether preamble or data is transmitted in the WiMAX system. For example, the signal type x1 may be 1 in case where preamble is transmitted in the WiMAX system and 0 in case where data is transmitted.

The cancellation signal generator 604B of the second embodiment generates cancellation signals when the WiMAX system transmits a preamble is different from the cancellation signal when the WiMAX system transmits data.

Figure 11:
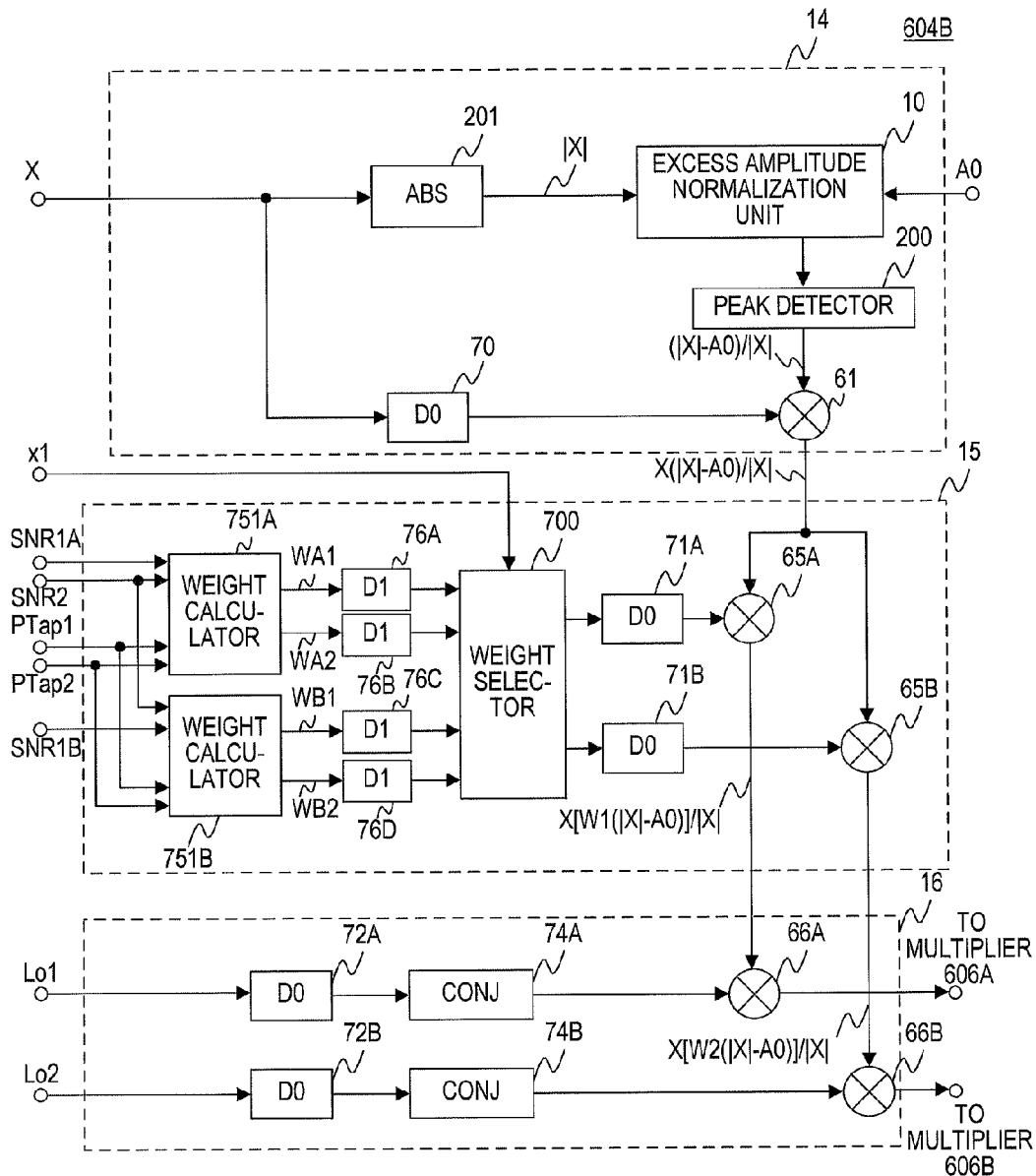
FIG. 11 is a block diagram illustrating a configuration of a peak cancellation signal generator of the second embodiment.

FIG. 11 is a block diagram illustrating the configuration of the peak cancellation signal generator 604B of the second embodiment.

The peak cancellation signal generator 604B of the second embodiment includes an absolute value circuit 201, an excess amplitude normalization unit 10, a peak detector 200, weight calculators 751A and 751B, a weight selector 700, conjugate circuits 74A and 74B, multipliers 61, 65A, 65B, 66A, and 66B, and delay units 70, 71A, 71B, 72A, 72B, and 76A to 76D.

The weight calculator 751A calculates weight coefficients Wa1 and Wa2 to be multiplied with the detected maximum value based on the input signal noise ratios SNR1$a$ and SNR2 and the intensities PTap1 and PTap2 of the input transmission signals. The weight calculator 751B calculates weight coefficients Wb1 and Wb2 to be multiplied with the detected maximum value based on the input signal noise ratios SNR1$b$ and SNR2 and the intensities PTap1 and PTap2 of the input transmission signals. The configuration of the weight calculators 751A and 751B is the same as the configuration (FIG. 4) of the weight calculator 750 of the first embodiment described above.

The weight selector 700 selects one of the weight coefficient calculated by the weight calculator 751A and the weight coefficient calculated by the weight calculator 751B according to the signal type x1. The detailed configuration of the weight selector 700 will be described with reference to FIG. 12.

Figure 12:
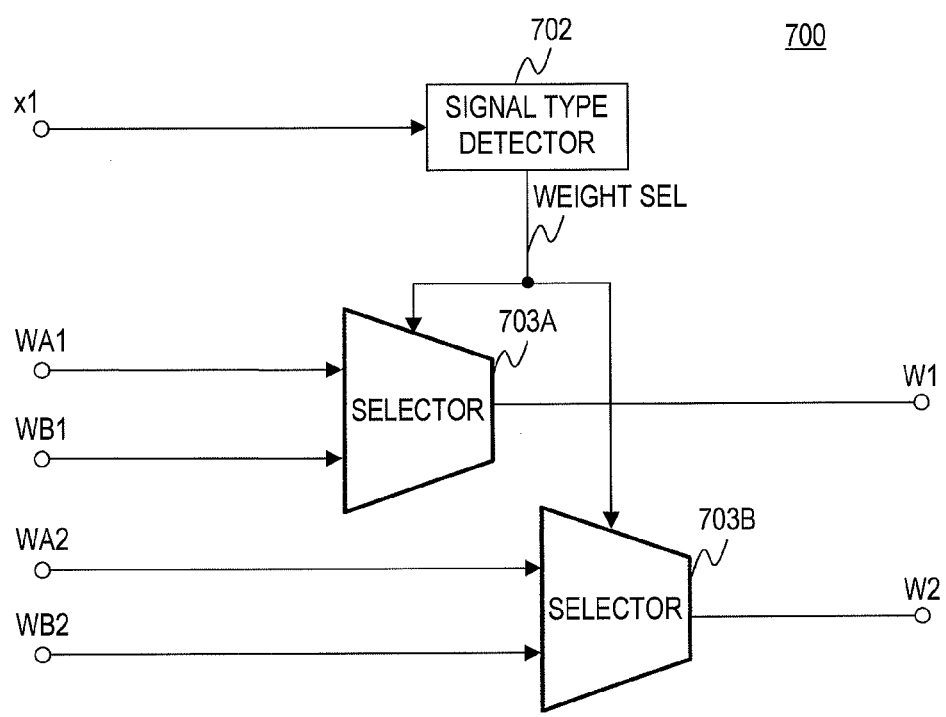
FIG. 12 is a block diagram illustrating the configuration of the weight selector of the second embodiment.

FIG. 12 is a block diagram illustrating the configuration of the weight selector 700 of the second embodiment.

The weight selector 700 of the second embodiment includes a signal type detector 702 and selectors 703A and 703B.

The signal type detector 702 generates a weight select signal (Weight Sel) according to the input signal type x1. The selectors 703A and 703B select the weight coefficients generated by the weight calculators 751A and 751B according to the weight select signal output from the signal type detector 702.

For example, since data is transmitted in case where the signal type x1 is 0, the signal type detector 702 outputs a weight select signal to the selectors 703A and 703B so that the weight coefficients Wa1 and Wa2 to be used when transmitting data are selected. On the other hand, since a preamble is transmitted in case where the signal type x1 is 1, the signal type detector 702 outputs a weight select signal to the selectors 703A and 703B so that the weight coefficients Wb1 and Wb2 to be used when transmitting a preamble are selected.

As described above, in the second embodiment, even if the required SNR is different depending on the type of signal transmitted in the wireless system, it is possible to reduce the peak factor according to the required SNR.

Moreover, by providing the weight selector 700, it is possible to reduce the peak factor according to the point in time when a time-multiplexed signal is transmitted.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A peak factor reduction device for reducing peak components included in a transmission signal, wherein
the peak factor reduction device generates a cancellation signal to be multiplexed on the transmission signal, and
the peak factor reduction device changes an amplitude of the generated cancellation signal according to a signal noise ratio required for the transmission signal and a power level of the transmission signal;
the peak factor reduction device includes:
a cancellation signal generator that generates the cancellation signal, wherein
the cancellation signal generator includes:
a peak detector that detects peak components included in the transmission signal;
a weight calculator that calculates a weight coefficient of the cancellation signal according to the signal noise ratio and the power level of the transmission signal; and
a cancellation signal combining unit that combines a cancellation signal having an amplitude proportional to the calculated weight coefficient, and
the weight calculator includes:
an SNR correction unit that calculates a logarithmic ratio of the signal noise ratios required for respective wireless systems or respective channels;
a filter response characteristic correcting unit that calculates a ratio of transmission power levels corrected with filter characteristics in at least one of the respective wireless systems and the respective channels; and
a normalization unit that normalizes the logarithmic ratio of the signal noise ratios calculated by the SNR correction unit and the ratio of the transmission power levels calculated by the filter response characteristic correcting unit to calculate weight coefficients of the transmission signals of the respective wireless systems or the respective channels.

2. The peak factor reduction device according to claim 1, wherein
the transmission signal includes multiplexed signals conforming to specifications of a plurality of wireless systems, and
the peak factor reduction device changes the amplitude of the generated cancellation signal according to the signal noise ratio and the power level of the transmission signal which are required for the transmission signal of each of the wireless systems.

3. The peak factor reduction device according to claim 1, wherein
the transmission signal includes multiplexed signals of a plurality of channels, and
the peak factor reduction device changes the amplitude of the generated cancellation signal according to the signal noise ratio and the power level of the transmission signal which are required for the transmission signal of each of the channels.

4. The peak factor reduction device according to claim 1, wherein
the transmission signal includes signals multiplexed on at least one of frequency and time, and
the peak factor reduction device changes the amplitude of the generated cancellation signal according to the signal noise ratio and the power level of the transmission signal which are required for the transmission signal with respect to each of the plurality of signals.

5. A peak factor reduction device for reducing peak components included in a transmission signal, wherein
the peak factor reduction device generates a cancellation signal to be multiplexed on the transmission signal,
the peak factor reduction device changes an amplitude of the generated cancellation signal according to a signal noise ratio required for the transmission signal and a power level of the transmission signal;
the transmission signal includes signals multiplexed on at least one of frequency and time, and
the peak factor reduction device changes the amplitude of the generated cancellation signal according to the signal noise ratio and the power level of the transmission signal which are required for the transmission signal with respect to each of the plurality of signals; and
the peak factor reduction device includes:
a cancellation signal generator that generates the cancellation signal, wherein
the cancellation signal generator includes:
a peak detector that detects peak components included in the transmission signal;
a weight calculator that calculates a weight coefficient of the cancellation signal according to the signal noise ratio and a power level of the transmission signal; and a cancellation signal combining unit that combines a cancellation signal having an amplitude proportional to the calculated weight coefficient, and the weight calculator includes:

an SNR correction unit that calculates a logarithmic ratio of the signal noise ratios required for the respective wireless systems or the respective channels;

a filter response characteristic correcting unit that calculates a ratio of filter characteristics of the respective wireless systems or the channels;

a normalization unit that normalizes the logarithmic ratio of the signal noise ratios calculated by the SNR correction unit and the ratio of the filter characteristics calculated by the filter response characteristic correcting unit to calculate weight coefficients of the transmission signals of the respective wireless systems or the respective channels; and a weight selector that selects the calculated weight coefficients according to a channel included in the transmission signal.

6. A wireless transmitter for transmitting a wireless signal, comprising:

a baseband signal generator that generates a baseband signal;

a peak factor reduction device that reduces peak components included in the baseband signal;

a frequency converter that generates a transmission signal modulated with the baseband signal; and a power amplifier that amplifies the transmission signal to a desired power level, wherein the peak factor reduction device generates a cancellation signal so as to be multiplexed on the transmission signal, and the peak factor reduction device changes an amplitude of the generated cancellation signal according to a signal noise ratio required for the transmission signal and a power level of the transmission signal;

the wireless transmitter further includes:

a cancellation signal generator that generates the cancellation signal, wherein the cancellation signal generator includes:

a peak detector that detects peak components included in the transmission signal;

a weight calculator that calculates a weight coefficient of the cancellation signal according to the signal noise ratio and the power level of the transmission signal; and a cancellation signal combining unit that combines a cancellation signal having an amplitude proportional to the calculated weight coefficient; and the weight calculator includes:

an SNR correction unit that calculates a logarithmic ratio of the signal noise ratios required for respective wireless systems or respective channels;

a filter response characteristic correcting unit that calculates a ratio of transmission power levels corrected with filter characteristics in at least one of the respective wireless systems and the respective channels; and a normalization unit that normalizes the logalithmic ratio of the signal noise ratios calculated by the SNR correction unit and the ratio of the transmission power levels calculated by the filter response characteristic correcting unit to calculate weight coefficients of the transmission signals of the respective wireless systems or the respective channels.

7. The wireless transmitter according to claim 6, wherein the transmission signal includes multiplexed signals conforming to specifications of a plurality of wireless systems, and the peak factor reduction device changes the amplitude of the generated cancellation signal according to the signal noise ratio and the power level of the transmission signal which are required for the transmission signal of each of the wireless systems.

8. The wireless transmitter according to claim 6, wherein the transmission signal includes multiplexed signals of a plurality of channels, and the peak factor reduction device changes the amplitude of the generated cancellation signal according to the signal noise ratio and the power level of the transmission signal which are required for the transmission signal of each of the channels.

9. The wireless transmitter according to claim 6, wherein the transmission signal includes signals multiplexed on at least one of frequency and time, and the peak factor reduction device changes the amplitude of the generated cancellation signal according to the signal noise ratio and the power level of the transmission signal required for the transmission signal with respect to each of the plurality of signals.

\* \* \* \* \*